United States Patent
Wichmann et al.

(10) Patent No.: US 9,863,135 B2
(45) Date of Patent: Jan. 9, 2018

(54) DUAL TAKE OFF SYSTEM

(71) Applicant: Sewer Equipment Company of America, Dixon, IL (US)

(72) Inventors: John Wichmann, Freeport, IL (US); Stanley Stuart, Milledgeville, IL (US)

(73) Assignee: Sewer Equipment Company of America, Dixon, IL (US)

( * ) Notice: Subject to any disclaimer, the term of this patent is extended or adjusted under 35 U.S.C. 154(b) by 46 days.

(21) Appl. No.: 15/044,539

(22) Filed: Feb. 16, 2016

(65) Prior Publication Data

US 2017/0233994 A1 Aug. 17, 2017

(51) Int. Cl.
| | | |
|---|---|---|
| *E03F 7/10* | (2006.01) | |
| *B08B 9/08* | (2006.01) | |
| *B08B 5/04* | (2006.01) | |
| *B08B 3/02* | (2006.01) | |
| *F04B 19/04* | (2006.01) | |
| *F04B 17/05* | (2006.01) | |
| *B60K 25/02* | (2006.01) | |

(52) U.S. Cl.
CPC .......... *E03F 7/10* (2013.01); *B08B 3/02* (2013.01); *B08B 5/04* (2013.01); *B08B 9/08* (2013.01); *F04B 17/05* (2013.01); *F04B 19/04* (2013.01); *B60K 25/02* (2013.01)

(58) Field of Classification Search
CPC ..... E03F 7/10; B08B 3/02; B08B 5/04; B08B 9/08; F04B 17/05; B60K 25/02
See application file for complete search history.

(56) References Cited

U.S. PATENT DOCUMENTS

| | | |
|---|---|---|
| 2,771,790 A | 11/1956 | Munschauer |
| 4,123,857 A | 11/1978 | Enters et al. |
| 4,822,106 A | 4/1989 | Wilson et al. |
| 6,438,792 B1 | 8/2002 | Cappellotto |
| 6,830,535 B2 | 12/2004 | Wylin |
| 6,848,406 B2 | 2/2005 | Ibukuro et al. |
| 7,152,569 B2 | 12/2006 | Leiber et al. |
| 7,361,114 B2 | 4/2008 | Boddy |
| 7,744,012 B2 | 6/2010 | Manders et al. |
| 2004/0089734 A1 | 5/2004 | Martin |
| 2011/0131752 A1 | 6/2011 | Place |

(Continued)

OTHER PUBLICATIONS

International Search Report for Application No. PCT/US16/19276 dated Jul. 26, 2010 (12 pages).

(Continued)

*Primary Examiner* — Dung Van Nguyen
(74) *Attorney, Agent, or Firm* — Michael Best & Friedrich LLP

(57) ABSTRACT

A motion-transmitting unit including a reciprocating engine having at least one piston operable for reciprocating motion during operation of the reciprocating engine, and a crankshaft interconnected with the at least one piston to rotate in response to the reciprocating motion of the at least one piston, the crankshaft having a first end and a second end opposite the first end. The motion-transmitting unit further includes a first drive shaft interconnected with the first end of the crankshaft to rotate in response to rotation of the crankshaft and a second drive shaft interconnected with the second end of the crankshaft to rotate in response to rotation of the crankshaft.

16 Claims, 3 Drawing Sheets

(56) References Cited

U.S. PATENT DOCUMENTS

2015/0037184 A1    2/2015  Rood et al.
2015/0354667 A1   12/2015  Tesar
2016/0137047 A1*   5/2016  Lim ..................... H02K 7/006
                                                   290/19
2016/0305317 A1*  10/2016  Telahigue ............. F01B 23/08

OTHER PUBLICATIONS

Written Opinion for Application No. PCT/US16/19276 dated Jul. 26, 2010 (10 pages).

* cited by examiner

DUAL TAKE OFF SYSTEM

FIELD OF THE INVENTION

The present invention relates to a crankshaft. Particular embodiments of the invention are concerned with a crankshaft in a work vehicle used for cleaning a sewer system.

SUMMARY

In a first aspect, the invention provides a motion-transmitting unit comprising: a reciprocating engine having at least one piston operable for reciprocating motion during operation of the reciprocating engine, and a crankshaft interconnected with the at least one piston to rotate in response to the reciprocating motion of the at least one piston, the crankshaft having a first end and a second end opposite the first end; a first drive shaft interconnected with the first end of the crankshaft to rotate in response to rotation of the crankshaft; and a second drive shaft interconnected with the second end of the crankshaft to rotate in response to rotation of the crankshaft.

In some configurations, the crankshaft defines a longitudinal axis, wherein the first end extends in a first direction along the longitudinal axis and the second end extends in a second direction opposite the first direction. In some configurations, the first drive shaft is selectively interconnected with a first driven component to selectively operate the first driven component in response to rotation of the first drive shaft, and the second drive shaft is selectively interconnected with a second driven component to selectively operate the second driven component in response to rotation of the second drive shaft. In some configurations, the first drive shaft is interconnected with a first driven component to operate the first driven component in response to rotation of the first drive shaft, and the second drive shaft is interconnected with a second driven component to operate the second driven component in response to rotation of the second drive shaft. In some configurations, at least one of the first drive shaft and the second drive shaft is rigidly interconnected to the crankshaft for concurrent rotation of crankshaft and the at least one of the first drive shaft and the second drive shaft. In some configurations, the at least one of the first drive shaft and the second drive shaft is rigidly interconnected to a respective at least one of the first driven component and the second driven component to concurrently operate the respective at least one of first driven component and the second driven component in response to rotation of the at least one of the first drive shaft and the second drive shaft. In some configurations, one of the first drive shaft and the second drive shaft is operable to drive a third driven component. In some configurations, the third driven component and the one of the first driven component and the second driven component are rigidly interconnected to concurrently operate the third driven component and the one of the first driven component and the second driven component in response to rotation of the one of the first drive shaft and the second drive shaft.

In another aspect the invention provides a work vehicle comprising: a first hydraulic pump and a second hydraulic pump; and a motion-transmitting unit including an internal combustion engine having at least one piston operable for reciprocating motion during operation of the internal combustion engine, and a crankshaft interconnected with the at least one piston to rotate in response to the reciprocating motion of the at least one piston, the crankshaft defining a longitudinal axis and including a first end extending in a first direction along the longitudinal axis and a second end extending in a second direction opposite the first direction, a first drive shaft rigidly interconnected to the first end of the crankshaft to rotate in response to rotation of the crankshaft and operable to drive the first hydraulic pump, and a second drive shaft rigidly interconnected to the second end of the crankshaft to rotate in response to rotation of the crankshaft and operable to drive the second hydraulic pump.

In some configurations, the work vehicle further comprises a hose arranged to direct fluid that is discharged from the work vehicle, wherein the first hydraulic pump includes a first hydrostatic pump operable to control the discharge of the fluid from the work vehicle. In some configurations, the work vehicle further comprises a third hydraulic pump, wherein the third hydraulic pump is driven by rotation of one of the first drive shaft and the second drive shaft. In some configurations, the work vehicle further comprises a hose reel, wherein the third hydraulic pump is operable to control a position of the hose reel. In some configurations, the work vehicle further comprises a fluid tank, wherein one of the first hydraulic pump, the second hydraulic pump, and the third hydraulic pump is operable to control recirculation of fluid to the fluid tank. In some configurations, at least one of the first drive shaft and the second drive shaft is selectively interconnected with a respective at least one of the first hydraulic pump and the second hydraulic pump to selectively operate the respective at least one of the first hydraulic pump and the second hydraulic pump in response to rotation of the at least one of the first drive shaft and the second drive shaft. In some configurations, at least one of the first drive shaft and the second drive shaft is rigidly interconnected to a respective at least one of the first hydraulic pump and the second hydraulic pump to concurrently operate the respective at least one of the first hydraulic pump and the second hydraulic pump in response to rotation of the at least one of the first drive shaft and the second drive shaft. In some configurations, the work vehicle further comprises a third hydraulic pump that is rigidly interconnected to one of the first hydraulic pump and the second hydraulic pump to concurrently operate the third hydraulic pump and the one of the first hydraulic pump and the second hydraulic pump in response to rotation of a respective one of the first drive shaft and the second drive shaft. In some configurations, the motion-transmitting unit further includes a primary drive shaft and wheels, the primary drive shaft being rigidly interconnected to the second end to rotate in response to rotation of the crankshaft, and the wheels being interconnected to the primary drive shaft to rotate in response to rotation of the primary drive shaft.

In a third aspect, the invention provides a method of operating a work vehicle comprising: rotating a crankshaft of an internal combustion engine by operation of the internal combustion engine; driving a first drive shaft that is operatively interconnected to a first end of the crankshaft, the first end extending in a first direction along a longitudinal axis of the crankshaft; operating a first hydraulic pump that is driven by the first drive shaft; driving a second drive shaft that is operatively interconnected to a second end of the crankshaft, the second end facing a second direction opposite the first direction; and operating a second hydraulic pump that is driven by the second drive shaft.

In some configurations, the method further comprises operating a third hydraulic pump that is driven by rotation of one of the first drive shaft and the second drive shaft. In some configurations, operating at least one of the first hydraulic pump and the second hydraulic pump includes selectively operating the at least one of the first hydraulic pump and the second hydraulic pump in response to driving a respective at least one of the first drive shaft and the second drive shaft. In some configurations, the method further comprises driving a vacuum of the work vehicle by operating the first hydraulic pump. In some configurations, the method further comprises discharging a high pressure fluid from the work vehicle by operating the second hydraulic pump.

In a fourth aspect, the invention provides a method of assembling a motion-transmitting unit that includes a prime mover, the prime mover having a crankshaft defining a longitudinal axis, a first end extending in a first direction along the longitudinal axis, and a second end extending in a second direction opposite the first direction, the method comprising: interconnecting a first drive shaft with the first end of the crankshaft to allow for rotation of the first drive shaft in response to rotation of the crankshaft; and interconnecting a second drive shaft with the second end of the crankshaft to allow for rotation of the second drive shaft in response to rotation of the crankshaft.

In some configurations, at least one of the first drive shaft and the second drive shaft is rigidly interconnected with the crankshaft for rotation with the crankshaft

DETAILED DESCRIPTION OF THE PRESENTLY PREFERRED EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As used herein, the term "interconnected" means direct coupling or coupling through intervening elements. For example, a reciprocating piston in an engine is interconnected with the crankshaft to drive rotary motion to the crankshaft in response to reciprocating motion of the piston. Such interconnection could be through substantially any means or mechanism including, for example and without limitation, by way of a connecting rod connected at one end to the piston (e.g., through a wrist pin or gudgeon pin) and at an opposite end (e.g., through a bearing block and crankpin) to the crankshaft.

As used herein, the term "selectively" when used in reference to operation of a component means that the component can be engaged for the operation or disengaged from the operation as selected by an operator or a control system.

As used herein, the term "rigidly interconnected" when used in reference to a first component being rigidly interconnected to a second component means that the first component receives or transfers all possible motion from or to the second component during operation. As an example, if two coaxial shafts are rigidly interconnected at respective ends of the coaxial shafts, then a 360 degree rotation of one of the coaxial shafts along a longitudinal axis will cause a 360 degree rotation of the other coaxial shaft along the longitudinal axis. Further, as used herein, the term "rigidly interconnected" means direct coupling or coupling through intervening elements.

Figure 1:
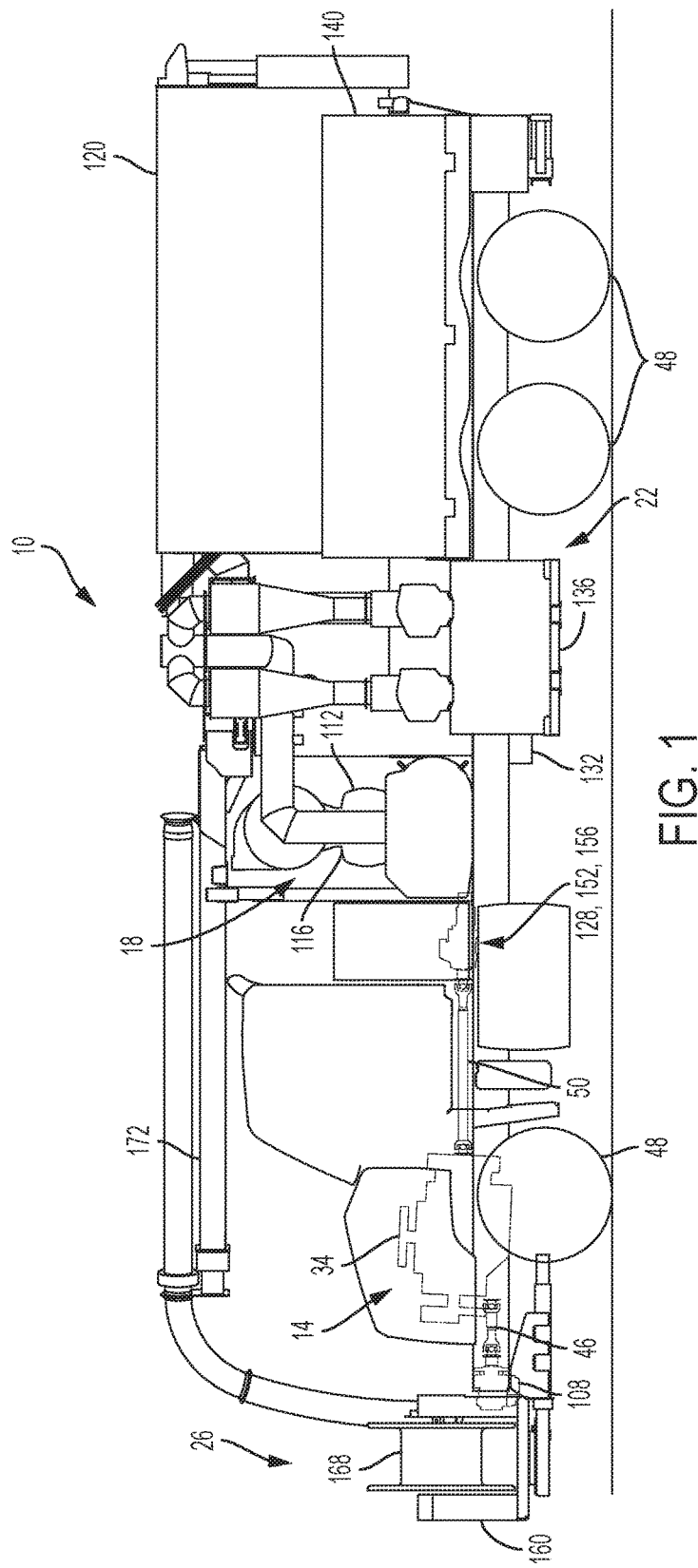
FIG. 1 is a side view of an embodiment of a work vehicle.
Figure 3:
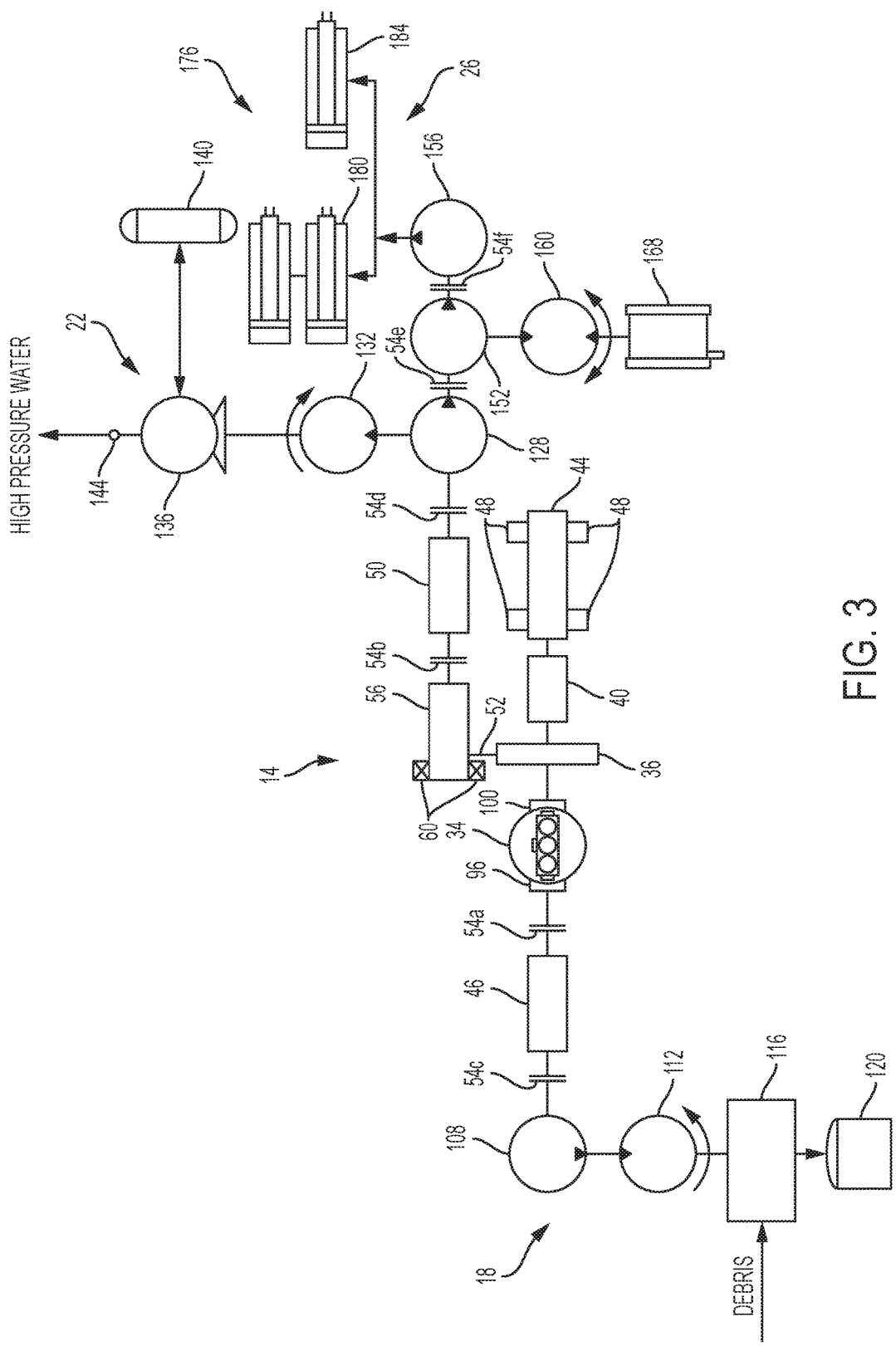
FIG. 3 is a schematic of a motion-transmitting unit, a vacuuming system, a jetting system, and a support system of the work vehicle of FIG. 1.

Referring to FIGS. 1 and 3, a work vehicle 10 includes a motion-transmitting unit 14, a vacuuming system 18, a jetting system 22, and a support system 26. As shown in FIG. 1, the work vehicle 10 is a vehicle configured for sewer cleaning operations. In other embodiments, the work vehicle 10 is one that is usable in other operations, including serving as an emergency response vehicle, an agricultural vehicle, or as another type of cleaning vehicle.

Figure 2:
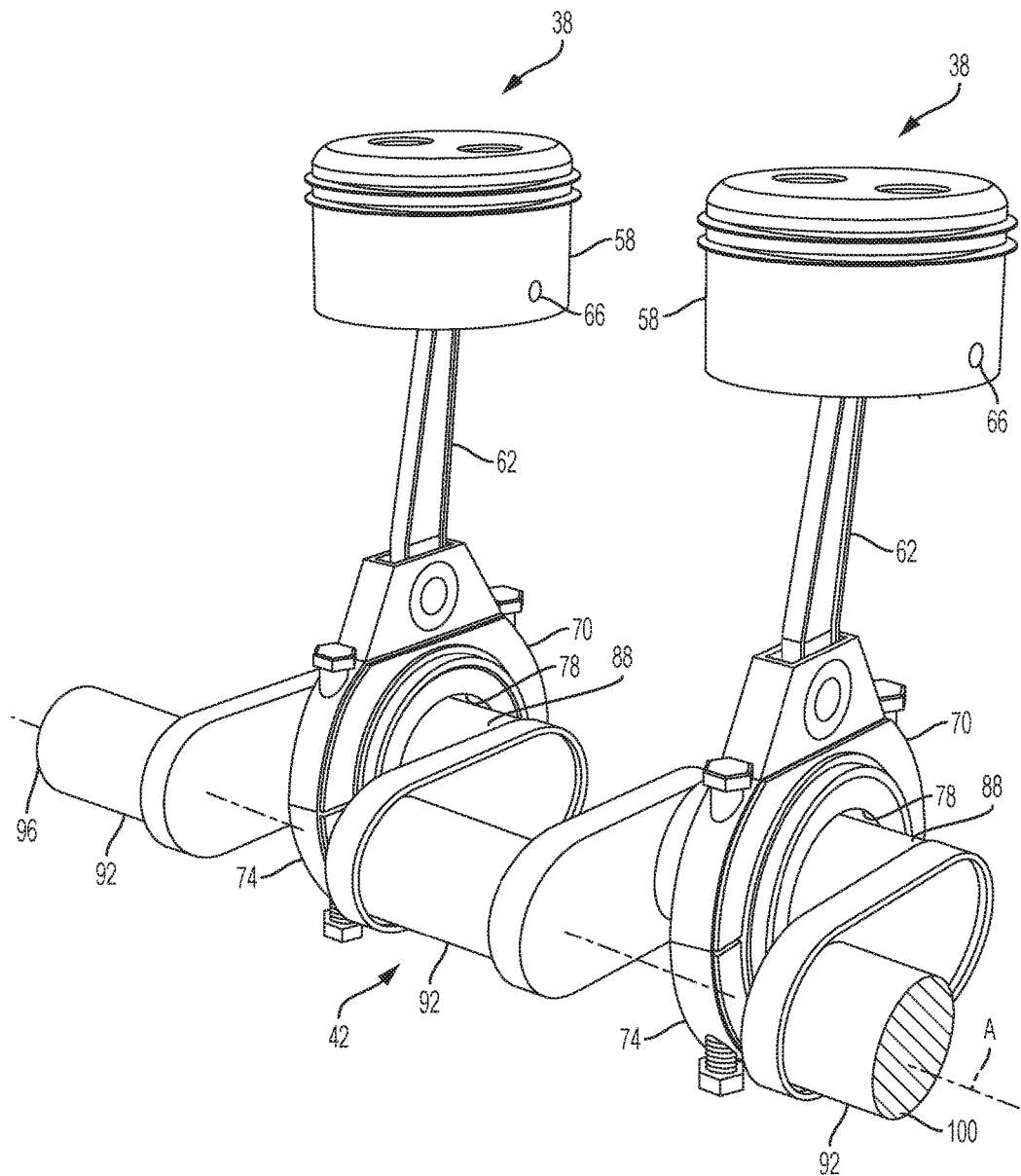
FIG. 2 is a perspective view of piston assemblies and a crankshaft of the work vehicle of FIG. 1.

Referring to FIGS. 1 to 3, the motion-transmitting unit 14 includes a reciprocating engine 34, piston assemblies 38, a crankshaft 42, a flywheel 36, a transmission 40, a primary drive shaft 44, and wheels 48. Additionally, the motion-transmitting unit 14 includes a rotation-transmitting assembly 52, a parallel shaft 56, bearings 60, a first drive shaft 46, a second drive shaft 50, and optional clutches 54a, 54b. In the illustrated embodiment, the reciprocating engine 34 is a diesel powered internal combustion engine. In other embodiments, other reciprocating engines may be used, including, for example, a gasoline internal combustion engine, a steam engine, or a sterling engine. Furthermore, in other embodiments, an electric motor or any other suitable prime mover may be utilized in place of a reciprocating engine.

As shown in FIG. 2, the piston assemblies 38 include pistons 58, connecting rods 62, gudgeon pins 66, upper caps 70, and lower caps 74. Each piston 58 couples to a respective connecting rod 62 by a respective gudgeon pin 66 at a top end or thin portion of the connecting rod 62. Each connecting rod 62, at a bottom end or thick portion of the connecting rod 62, couples to a respective upper cap 70 and a respective lower cap 74. The upper caps 70 and the lower caps 74 encase the bottom ends of the connecting rods 62 and are coupled to one another by various bolts. The upper caps 70 and the lower caps 74 together define annular channels 78. In other embodiments, different numbers of piston assemblies and other arrangements of piston assemblies may be used. For example, four pistons may be utilized.

The crankshaft 42, as best shown in FIG. 2, includes crank pins 88, main journals 92, a first end 96, and a second end 100. Each crank pin 88 is received within one of the annular channels 78. The crank pins 88 received in the annular channels 78 transfer the reciprocating motion of the pistons 58 into rotational motion of the crankshaft 42. The main journals 92 define a longitudinal axis A of the crankshaft 42, about which the crankshaft 42 rotates. The first end 96 extends in a first direction along the longitudinal axis A. The second end 100 extends along the longitudinal axis A in a second direction that is opposite the first direction.

Referring to FIG. 3, the flywheel 36 is rigidly interconnected to the second end 100 of the crankshaft 42 (e.g., by a sleeve coupling, clamp coupling, tapered shaft lock, hirth joint, or similar coupling means). Further, the flywheel 36 is rigidly interconnected to the transmission 40. Similarly, the transmission 40 is interconnected to the primary drive shaft 44, and the primary drive shaft 44 is interconnected to the wheels 48. In the illustrated embodiment, the flywheel 36 and the primary drive shaft 44 are arranged along the longitudinal axis A and are coaxial with the crankshaft 42. In other embodiments, a clutch may be arranged between any of the flywheel 36, the transmission 40, the primary drive shaft 44, and the wheels 48, to allow for selective interconnecting of the components by an operator or a control system. Further, in other embodiments, the second end 100 and the flywheel 36 and/or the flywheel 36 and the transmission 40 may be interconnected. For example, this can be done by the use of flexible couplings (e.g., by mating universal joints, beam couplings, gear couplings, grid couplings, or related mechanisms).

Referring to FIGS. 1 and 3, the first drive shaft 46 is interconnected to the first end 96 of the crankshaft 42. The second drive shaft 50 is interconnected to the second end 100 of the crankshaft 42. More particularly, as shown in FIG. 3, the second drive shaft 50 is rigidly interconnected to the parallel shaft 56. The parallel shaft 56, as illustrated, is arranged parallel to the primary drive shaft 44. Further, the parallel shaft 56 is rigidly interconnected through the rotation-transmitting assembly 52 to the flywheel 36. The parallel shaft 56 is supported by the bearings 60 in a housing of the reciprocating engine 34, and the parallel shaft 56 is integrated into the housing of the reciprocating engine 34. In the illustrated embodiment, the rotation-transmitting assembly 52 includes meshing gears which rigidly interconnect the flywheel 36 to the parallel shaft 56. In other embodiments, the rotation-transmitting assembly 52 may include a chain, a belt drive, or other suitable means for transmitting rotation. Further, in other embodiments, the rotation-transmitting assembly 52 may be interconnected to the flywheel 36 and/or the parallel shaft 56. Moreover, in other embodiments a clutch may be arranged between any of the rotation-transmitting assembly 52, the flywheel 36, and the parallel shaft 56 to allow for selective interconnecting of the rotation-transmitting assembly 52, the flywheel 36, and the parallel shaft 56.

As illustrated in FIGS. 1 and 3, the first drive shaft 46 is interconnected to the first end 96 of the crankshaft 42 by universal joints on the first end 96 and an end of the first drive shaft 46. The second drive shaft 50 is interconnected to the second end 100 of the crankshaft 42, through the parallel shaft 56, by mating universal joints on respective ends of the second drive shaft 50 and the parallel shaft 56. In preferred embodiments, however, the first drive shaft 46 is rigidly interconnected to the first end 96 of the crankshaft 42. Further, in preferred embodiments, the second drive shaft 50 is rigidly interconnected to the parallel shaft 56, which is in turn rigidly interconnected to the flywheel 36, which is rigidly interconnected to the second end 100 of the crankshaft 42. Accordingly, in the preferred embodiment the second drive shaft 50 is rigidly interconnected with the second end 100 of the crankshaft 42.

In optional embodiments, as best shown in FIG. 3, the clutches 54a, 54b may be arranged between either one or both of the first end 96 and the first drive shaft 46, and the second end 100 and the second drive shaft 50. The clutches 54a, 54b allow for selective interconnecting of the crankshaft 42 to the respective first and second drive shafts 46, 50. This allows for selective rotation of one or both of the first and second drive shafts 46, 50 during rotation of the crankshaft 42. The clutches 54a, 54b may be controllable by the operator or the control system. As shown in FIG. 3, the clutch 54b is arranged between the parallel shaft 56 and the second drive shaft 50. However, in other embodiments, the clutch 54b may be placed elsewhere between the second end 100 of the crankshaft 42 and the second drive shaft 50. Furthermore, in other embodiments, the first drive shaft 46 and the second drive shaft 50 may be interconnected to the first and second ends 96, 100 of the crankshaft 42. For example, between the first end 96 and the first drive shaft 46, and the parallel shaft 56 and the second drive shaft 50, flexible couplings can be used such as the mating universal joints as illustrated in FIG. 1, or beam couplings, gear couplings, grid couplings, or related mechanisms.

Referring to FIGS. 1 and 3, the vacuuming system 18 includes a first driven component or first hydraulic pump 108, an optional clutch 54c, a first hydraulic motor 112, a vacuum 116, and a debris tank 120. The first hydraulic pump 108 interconnects to an end of the first drive shaft 46 opposite the parallel shaft 56 and is driven by rotation of the first drive shaft 46. In preferred embodiments, the first hydraulic pump 108 and the first drive shaft 46 are rigidly interconnected to one another. Further, in the illustrated embodiment, the first hydraulic pump 108 is a first hydrostatic pump. In other embodiments, other types of hydraulic pumps may be utilized. In optional embodiments, as best shown in FIG. 3, the clutch 54c may be arranged between the first drive shaft 46 and the first hydraulic pump 108. In such configurations, the clutch 54c allows for selective interconnecting of the first drive shaft 46 to the first hydraulic pump 108 to allow for selective operation of the first hydraulic pump 108 while the first drive shaft 46 is rotating.

The first hydraulic pump 108 fluidly communicates with the first hydraulic motor 112 to drive the first hydraulic motor 112 using a working fluid (e.g., oil). The first hydraulic motor 112, in turn, operates the vacuum 116. The vacuum 116 has an inlet for the intake of debris. The vacuum 116 further has an outlet that is arranged to direct the debris to the debris tank 120. In the illustrated embodiment, the vacuum 116 includes a blower. In other embodiments, the vacuum 116 may include a fan, a vane pump, a liquid ring pump, or any other suitable means for creating a negative pressure.

Referring to FIGS. 1 and 3, the jetting system 22 includes a second driven component or second hydraulic pump 128, an optional clutch 54d, a second hydraulic motor 132, a water pump 136, a fluid tank 140, and a hose 144. The second hydraulic pump 128 interconnects to an end of the second drive shaft 50 opposite the crankshaft 42 and is driven by rotation of the second drive shaft 50.

In preferred embodiments, the second hydraulic pump 128 and the second drive shaft 50 are rigidly interconnected. As illustrated, the second hydraulic pump 128 is a second hydrostatic pump. In other embodiments, other types of hydraulic pumps may be utilized. In optional embodiments, as best shown in FIG. 3, the clutch 54d may be arranged between the second drive shaft 50 and the second hydraulic pump 128 to allow for selective interconnecting of the second drive shaft 50 and the second hydraulic pump 128.

The second hydraulic pump 128 fluidly communicates with the second hydraulic motor 132 to drive the second hydraulic motor 132 using a working fluid (e.g. oil). The second hydraulic motor 132, in turn, operates the water pump 136. The water pump 136 has an inlet for receiving fluid (e.g., water) from the fluid tank 140. The water pump 136 also has an outlet that is fluidly coupled to the hose 144 for the discharge of high pressure water from the water pump 136. The water pump 136 can also be operated to return water to the fluid tank 140. This allows for recirculation between the water pump 136 and the fluid tank 140 to reduce the likelihood of fluid freezing in the fluid tank 140 when the work vehicle 10 is in cold conditions. This recirculation function may be selectively turned on by the operator, and may include the opening and closing of various valves.

The support system 26 includes a third driven component or third hydraulic pump 152, a fourth driven component or fourth hydraulic pump 156, a third hydraulic motor 160, a hose reel 168, a boom 172 (e.g., a support for a suction hose of the vacuum 116), a hydraulic cylinder assembly 176, and optional clutches 54e, 54f. The third hydraulic pump 152 is rigidly interconnected to the second hydraulic pump 128 by mechanical means. Accordingly, the second hydraulic pump 128 and the third hydraulic pump are concurrently or simultaneously driven by rotation of the second drive shaft 50. Further, the third hydraulic pump 152 has an outlet that is fluidly coupled to an inlet of the third hydraulic motor 160 for driving the third hydraulic motor 160. The third hydraulic motor 160, in turn, drives or rotates the hose reel 168. In the illustrated embodiment, the third hydraulic motor 160 is a bidirectional motor. In other embodiments, the second hydraulic pump 128 and the third hydraulic pump 152 may be interconnected. Alternatively, the second hydraulic pump 128 and the third hydraulic pump 152 may be selectively interconnected by use of the optional clutch 54e.

The fourth hydraulic pump 156 is rigidly interconnected to the third hydraulic pump 152. Accordingly, the second hydraulic pump 128, the third hydraulic pump, and the fourth hydraulic pump 156 are concurrently or simultaneously driven by rotation of the second drive shaft 50. Further, the fourth hydraulic pump 156 has an outlet that fluidly couples the fourth hydraulic pump 156 to the hydraulic cylinder assembly 176. The hydraulic cylinder assembly 176 includes a plurality of hydraulic cylinders 180. The plurality of hydraulic cylinders 180 are arranged to adjust the boom 172 and, accordingly, the suction hose of the vacuum 116. The hydraulic cylinder assembly 176 also includes a hose reel hydraulic cylinder 184. The hose reel hydraulic cylinder 184 is operable to extend and/or retract the hose 144. In other embodiments, the third hydraulic pump 152 and the fourth hydraulic pump 156 may be interconnected. Alternatively, the third hydraulic pump 152 and the fourth hydraulic pump 156 may be selectively interconnected by use of the optional clutch 54f.

Use of the work vehicle 10 on-site includes a number of steps. While departing for a work site, the wheels 48 are rotating due to operation of the motion-transmitting unit 14 and rotation of the primary drive shaft 44. During this time, the vacuuming system 18, the jetting system 22, and the support system 26 are all operable. However, given the role of the work vehicle 10 as a sewer cleaning vehicle, the systems 18, 22, and 26 are generally turned off or rendered temporarily inoperable by the operator while the wheels 48 are rotating.

Once the work vehicle 10 has reached the work site, the work vehicle 10 is parked so that the wheels 48 are no longer rotating. Operation of the motion-transmitting unit 14, however, continues, and the operator may turn on the systems 18, 22, and 26 as needed. As discussed above, the reciprocating engine 34 of the motion-transmitting unit 14 creates reciprocating motion in the pistons 58. The reciprocating motion in the pistons 58 causes the crankshaft 42 to rotate. In turn, the crankshaft 42 rotates the first drive shaft 46 which is operatively interconnected to the first end 96 of the crankshaft 42 (e.g., by a rigid interconnection). The first drive shaft 46 then drives the first hydraulic pump 108 which drives the vacuum 116, as described above.

The crankshaft 42 also rotates the second drive shaft 50 which is operatively interconnected to the second end 100 of the crankshaft 42 (e.g., by a rigid interconnection). The second drive shaft 50 then drives the second hydraulic pump 128 to discharge high pressure fluid from the hose 144, as is described above. Additionally, rotation of the second drive shaft 50 also drives the third hydraulic pump 152 to rotate the hose reel 168 and drives the fourth hydraulic pump 156 to extend or retract the hose 144 and adjust the position of the boom 172, as discussed above.

The work vehicle 10 has numerous technical benefits compared to conventional sewer cleaning vehicles. Conventional sewer cleaning vehicles utilize an engine with a single drive shaft to drive various systems. Oftentimes, power that is normally directed to the rear wheels of the conventional sewer cleaning vehicle by the engine is diverted from a gearbox of the engine to drive the various systems (i.e., to power a vacuum). Such a conventional operation may give rise to inefficiencies. Further, conventional systems cannot run the engine while also being able to operate all the various systems.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A motion-transmitting unit comprising:
a reciprocating engine having
at least one piston operable for reciprocating motion during operation of the reciprocating engine, and
a crankshaft interconnected with the at least one piston to rotate in response to the reciprocating motion of the at least one piston, the crankshaft having a first end and a second end opposite the first end;
a first drive shaft interconnected with the first end of the crankshaft to rotate in response to rotation of the crankshaft the first drive shaft is configured to operate a first pump;
a second drive shaft interconnected with the second end of the crankshaft to rotate in response to rotation of the crankshaft, the second drive shaft is configured to operate a second pump;
a primary drive shaft interconnected with the second end of the crankshaft to rotate in response to rotation of the crankshaft and configured to drive operation of a component of the motion-transmitting unit unrelated to the first and second pumps.

2. The motion-transmitting unit of claim 1, wherein the crankshaft defines a longitudinal axis, and wherein the first end extends in a first direction along the longitudinal axis and the second end extends in a second direction opposite the first direction.

3. The motion-transmitting unit of claim 1, wherein the first pump is operable to power a vacuum or a fluid jetting system.

4. The motion-transmitting unit of claim 1, wherein at least one of the first drive shaft and the second drive shaft is rigidly interconnected to the crankshaft for concurrent rotation of crankshaft and the at least one of the first drive shaft and the second drive shaft.

5. The motion-transmitting unit of claim 4, wherein the first drive shaft is rigidly interconnected to the first pump to operate the first pump in response to rotation of the first drive shaft.

6. The motion-transmitting unit of claim 4, wherein the second drive shaft is rigidly interconnected to a second pump to operate the second pump in response to rotation of the second drive shaft.

7. A work vehicle comprising:
a first hydraulic pump and a second hydraulic pump; and
a motion-transmitting unit including an internal combustion engine having
- at least one piston operable for reciprocating motion during operation of the internal combustion engine, and
- a crankshaft interconnected with the at least one piston to rotate in response to the reciprocating motion of the at least one piston, the crankshaft defining a longitudinal axis and including a first end extending in a first direction along the longitudinal axis and a second end extending in a second direction opposite the first direction,
- a first drive shaft rigidly interconnected to the first end of the crankshaft to rotate in response to rotation of the crankshaft and operable to drive the first hydraulic pump, and
- a second drive shaft rigidly interconnected to the second end of the crankshaft to rotate in response to rotation of the crankshaft and operable to drive the second hydraulic pump.

8. The work vehicle of claim 7, further including a vacuum, wherein the first hydraulic pump includes a first hydrostatic pump operable to control operation of the vacuum.

9. The work vehicle of claim 8, further comprising a hose arranged to direct fluid that is discharged from the work vehicle, wherein the second hydraulic pump includes a second hydrostatic pump operable to control the discharge of the fluid from the work vehicle.

10. The work vehicle of claim 9, further comprising a third hydraulic pump, wherein the third hydraulic pump is driven by rotation of one of the first drive shaft and the second drive shaft.

11. The work vehicle of claim 10, further comprising a hose reel, wherein the third hydraulic pump is operable to control a position of the hose reel.

12. The work vehicle of claim 10, further comprising a fluid tank, wherein one of the first hydraulic pump, the second hydraulic pump, and the third hydraulic pump is operable to control recirculation of fluid to the fluid tank.

13. The work vehicle of claim 7, wherein at least one of the first drive shaft and the second drive shaft is selectively interconnected with a respective at least one of the first hydraulic pump and the second hydraulic pump to selectively operate the respective at least one of the first hydraulic pump and the second hydraulic pump in response to rotation of the at least one of the first drive shaft and the second drive shaft.

14. The work vehicle of claim 7, wherein at least one of the first drive shaft and the second drive shaft is rigidly interconnected to a respective at least one of the first hydraulic pump and the second hydraulic pump to concurrently operate the respective at least one of the first hydraulic pump and the second hydraulic pump in response to rotation of the at least one of the first drive shaft and the second drive shaft.

15. The work vehicle of claim 14, further comprising a third hydraulic pump that is rigidly interconnected to one of the first hydraulic pump and the second hydraulic pump to concurrently operate the third hydraulic pump and the one of the first hydraulic pump and the second hydraulic pump in response to rotation of a respective one of the first drive shaft and the second drive shaft.

16. The work vehicle of claim 7, the motion-transmitting unit further including a primary drive shaft and wheels, the primary drive shaft being rigidly interconnected to the second end to rotate in response to rotation of the crankshaft, and the wheels being interconnected to the primary drive shaft to rotate in response to rotation of the primary drive shaft.

* * * * *